United States Patent
Ye et al.

(10) Patent No.: US 10,440,559 B2
(45) Date of Patent: Oct. 8, 2019

(54) PRIVATE MOBILE EDGE COMPUTING DATA CENTER IN A TELECOMMUNICATION NETWORK

(71) Applicant: Futurewei Technologies, Inc., Plano, TX (US)

(72) Inventors: Yinghua Ye, Los Gatos, CA (US); Hang Shi, Fremont, CA (US); Yewei Tang, San Ramon, CA (US); Huida Dai, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/793,110

(22) Filed: Oct. 25, 2017

(65) Prior Publication Data
US 2019/0124496 A1 Apr. 25, 2019

(51) Int. Cl.
H04W 8/08 (2009.01)
H04W 8/20 (2009.01)
H04W 84/04 (2009.01)
H04L 12/773 (2013.01)

(52) U.S. Cl.
CPC .......... H04W 8/20 (2013.01); H04W 8/08 (2013.01); *H04L 45/60* (2013.01); *H04W 84/045* (2013.01)

(58) Field of Classification Search
CPC ......... H04W 8/20; H04W 8/08; H04W 12/08; H04W 16/18; H04W 36/14; H04W 12/06; H04L 41/12; H04L 41/0803; H04L 47/70; H04L 63/101; H04L 63/0892
See application file for complete search history.

(56) References Cited

U.S. PATENT DOCUMENTS

| 2017/0251368 A1* | 8/2017 | Ross ..................... H04W 12/08 |
| 2018/0139107 A1* | 5/2018 | Senarath ................ H04L 41/12 |
| 2018/0139691 A1* | 5/2018 | Onishi .................. H04W 36/14 |
| 2018/0183855 A1* | 6/2018 | Sabella .................. H04L 67/10 |

FOREIGN PATENT DOCUMENTS

| CN | 105306366 A | 2/2016 |
| WO | 2016128055 A1 | 8/2016 |

OTHER PUBLICATIONS

International Search Report and Written Opinion issued in International Application No. PCT/CN2018/111240 dated Jan. 15, 2019, 10 pages.

* cited by examiner

Primary Examiner — Thanh C Le
(74) Attorney, Agent, or Firm — Fish & Richardson P.C.

(57) ABSTRACT

A computer-implemented method for processing a data packet in a communication network includes receiving, at a private Mobile Edge Computing (MEC) data center, the data packet. The private MEC data center hosts one or more virtual Evolved Packet Core (EPC) gateways, and each of the one or more virtual Evolved Packet Core (EPC) gateways corresponds to one or more respective Public Land Mobile Network (PLMN) service providers. The private MEC data center identifies a traffic routing type for the data packet. The private MEC data center transmits the data packet based on the identified traffic routing type.

20 Claims, 8 Drawing Sheets

PRIVATE MOBILE EDGE COMPUTING DATA CENTER IN A TELECOMMUNICATION NETWORK

CROSS-REFERENCE TO RELATED APPLICATIONS

None.

TECHNICAL FIELD

This disclosure relates to a private mobile edge computing (MEC) data center in a telecommunication network.

BACKGROUND

Traditionally, network functions in a telecommunication network can be implemented using proprietary hardware and software that is tightly coupled with the hardware. In one example, a core network in a Long Term Evolution (LTE) communication system may be implemented by using multiple physical nodes, including a Mobility Management Entity (MME), a Serving Gateway (SGW), and a Packet Data Network Gateway (PDN GW or PGW). A SGW, a PGW, or a combination of both can also be referred to as an Evolved Packet Core (EPC) gateway GW. In another example, a core network in a fifth-generation (5G) network may be implemented by a user plane function (UPF), a session management function (SMF), or an access management function (AMF).

SUMMARY

The present disclosure describes a private mobile edge computing (MEC) data center in a telecommunication network.

In a first implementation, a computer-implemented method for processing a data packet in a communication network includes: receiving, at a private Mobile Edge Computing (MEC) data center, the data packet, where the private MEC data center hosts one or more virtual Evolved Packet Core (EPC) gateways, and each of the one or more virtual Evolved Packet Core (EPC) gateways corresponds to a respective Public Land Mobile Network (PLMN) service provider of one or more PLMN service providers corresponding to the one or more virtual EPC gateways; identifying, by the private MEC data center, a traffic routing type for the data packet; and transmitting, from the private MEC data center, the data packet based on the identified traffic routing type.

In a second implementation, a private Mobile Edge Computing (MEC) data center, includes a non-transitory memory storage comprising instructions; and one or more hardware processors in communication with the memory storage, where the one or more hardware processors execute the instructions to: receive, at the private Mobile Edge Computing (MEC) data center, the data packet, where the private MEC data center hosts one or more virtual Evolved Packet Core (EPC) gateways, and each of the one or more virtual Evolved Packet Core (EPC) gateways corresponds to a respective Public Land Mobile Network (PLMN) service provider of one or more PLMN service providers corresponding to the one or more virtual EPC gateways; identify, by the private MEC data center, a traffic routing type for the data packet; and transmit, from the private MEC data center, the data packet based on the identified traffic routing type.

In a third implementation, a non-transitory computer-readable medium storing computer instructions for processing a data packet in a communication network, that when executed by one or more hardware processors, cause the one or more hardware processors of a router to perform operations including: receiving, at a private Mobile Edge Computing (MEC) data center, the data packet, where the private MEC data center hosts one or more virtual Evolved Packet Core (EPC) gateways, and each of the one or more virtual Evolved Packet Core (EPC) gateways corresponds to a respective Public Land Mobile Network (PLMN) service provider of one or more PLMN service providers corresponding to the one or more virtual EPC gateways; identifying, by the private MEC data center, a traffic routing type for the data packet; and transmitting, from the private MEC data center, the data packet based on the identified traffic routing type.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method and the instructions stored on the non-transitory, computer-readable medium.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
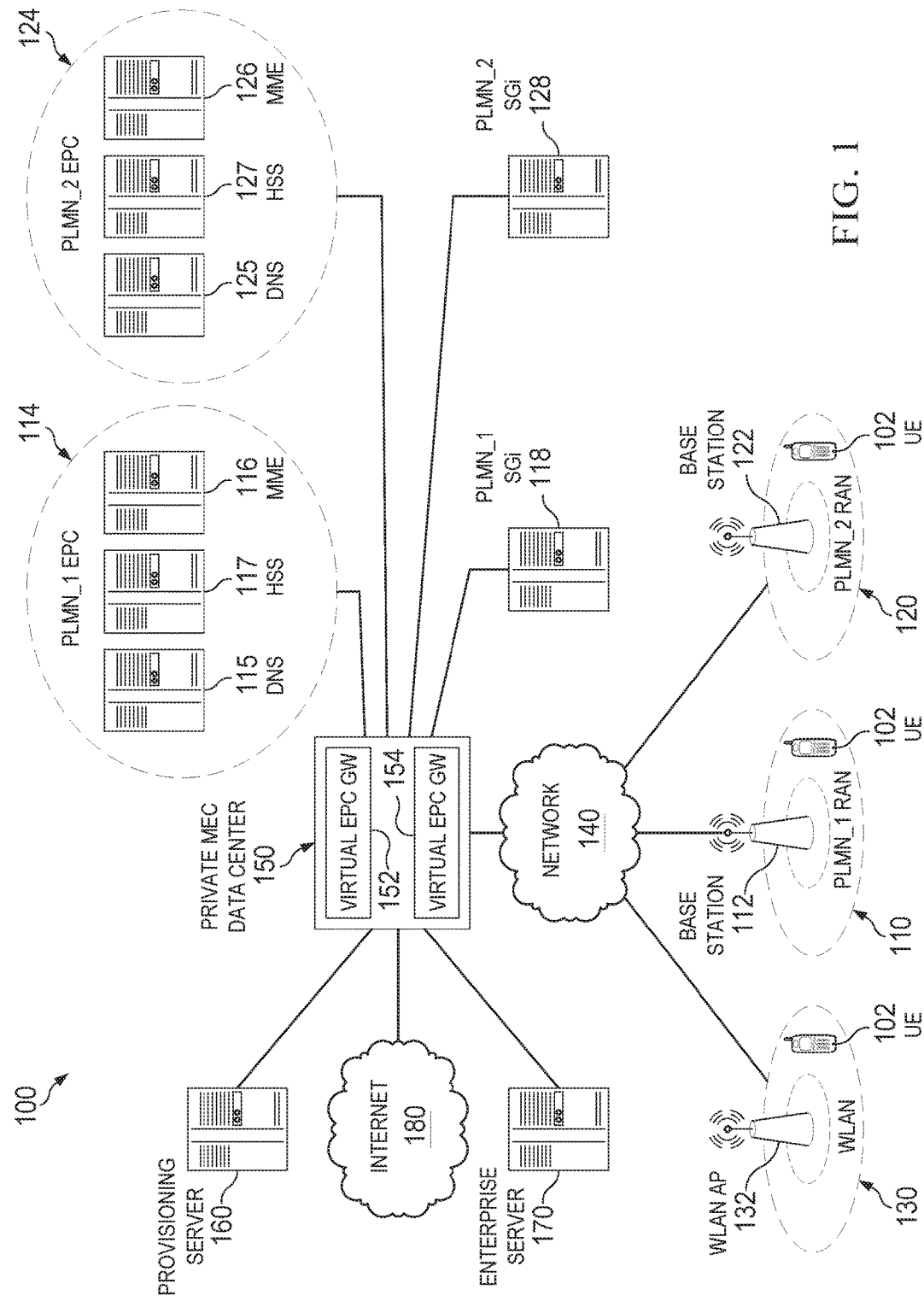
FIG. 1 is an example wireless communication system that supports a private mobile edge computing (MEC) data center, according to an implementation.

The following detailed description describes a private mobile edge computing (MEC) data center in a telecommunication network and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail inasmuch as such details are within the skill of one of ordinary skill in the art. The present disclosure is not intended to be limited to the described or illustrated implementations, but to be accorded the widest scope consistent with the described principles and features.

In some cases, a telecommunication network can be owned and operated by a public land mobile network (PLMN) service provider. The PLMN service provider may control the operations of each network node in the telecommunication network, including e.g., the base station, the Mobility Management Entity (MME), or the Evolved Packet Core (EPC) gateway (GW). Through these network nodes, the PLMN service provider can provide connectivity to public users that have subscribed services at the PLMN service provider. For example, a user may pay a monthly fee to a particular PLMN service provider, and uses the network of the particular PLMN service provider to obtain data and voice services on the user's mobile phone. Examples of the PLMN service providers include VERIZON, AT&T, SPRINT, T-MOBILE, and the like. A PLMN service provider may also be referred to as an operator.

In some cases, a private enterprise may also own and operate a telecommunication network. The private enterprise may control the operations of each network node in the private network, and provide services to members of the private enterprise. The members of the private enterprise can be employees, contractors, customers, or other personnel that are associated with the private enterprise.

In some implementations, instead of using network nodes such as MME or EPC GW, part or all of the network functions can be implemented using virtual network functions (VNFs). In VNF implementations, network functions of a MME or an EPC GW can be implemented using software modules that are decoupled from the underlying hardware. This approach can simplify the implementations and maintenance of a telecommunication network and save operating and capital expenses. In some cases, VNFs can be implemented using MEC data centers. A MEC data center is a computing platform that provides data processing capabilities, storage capacities, connectivity, and other resources that can be used to implement VNFs at the edge of the telecommunication network. The MEC data center can include a hardware computing platform that supports one or more virtual machines or containers, each supporting one or more VNFs. In some cases, the MEC data center can be implemented using a cloud computing architecture.

A private enterprise can use a private MEC data center to implement part or all of the network functions of its network. The private MEC data center is an MEC data center that is owned, operated, or owned and operated by the private enterprise. In some cases, the private enterprise can own the private MEC data center. Alternatively, a PLMN service provider or other service providers can own the private MEC data center and offer subscription services to the private enterprise. The private enterprise can subscribe an MEC data center from a PLMN service provider and use the subscribed MEC data center as the private MEC data center. The private MEC data center can also be referred to as an enterprise MEC data center. In one configuration, the private MEC data center can support VNFs for functionalities of the MME, the SGW, and other network nodes. In some cases, a private MEC data center can also support VNFs for part of base station functionalities, e.g., some functionalities performed by a base band unit. This configuration can provide data transmission efficiency and low latency for traffic within the private network, but it puts burdens on the private enterprise to own and operate an entire network, without leveraging resources and expertise of the PLMN service provider that operates the public network.

In another configuration, the private MEC data center can be used as a breakout solution that decouples the user plane operations and the control plane operations. In this example, the user plane operations, including, e.g., functions performed by the base station and the EPC GW, can be implemented by VNFs in the private MEC data center. The control plane operations, including, e.g., functions performed by the MME, can remain in the network of the PLMN service provider. While this configuration may provide some function-sharing between the private and public network, it may still be cumbersome for the private enterprise to operate specialized network functions such as the functions of the base station.

In some implementations, a private MEC data center can be used to implement the functions of the EPC GW. The private MEC data center can interact with the base station and the MME of a PLMN service provider. This approach can provide an integrated solution that provides low latency, high bandwidth, and good quality of service to users of the private enterprise, while also providing opportunities for operators to share their resources of base stations and MMEs. In addition, the private MEC data center can host multiple VNFs, each representing a virtual EPC GW for a particular PLMN service provider. The private MEC data center can provide routing functions for data traffic between the virtual EPC GW for a particular PLMN service provider and the corresponding base station and MME of that particular PLMN service provider. In some cases, traffic policies can be provisioned at the private MEC data center to control the transmissions of the data traffic. FIGS. 1-9 and associated descriptions provide additional details of these implementations. Moreover, while the following descriptions refer to Long Term Evolution (LTE) networks as example illustrations, similar methods can be applied to a fifth generation (5G) network or other types of telecommunication networks. For example, in a 5G network, the functionality of the EPC GW can be implemented by a user plane function (UPF), and the functionality of a MME can be implemented by a session management function (SMF), an access management function (AMF), or a combination thereof. Accordingly, the private MEC data center can host VNFs implementing virtual UPFs for different PLMN service providers. The private MEC data center can provide routing functions for data traffic between the virtual UPF for a particular PLMN service provider and the corresponding base station, SMF, or AMF of that particular PLMN service provider.

FIG. 1 is an example wireless communication system 100 that supports a private MEC data center, according to an implementation. The example wireless communication system 100 includes a private MEC data center 150 that is communicatively coupled with a provisioning server 160, the Internet 180, an enterprise server 170, a PLMN_1 EPC 114, a PLMN_2 EPC 124, a PLMN_1 SGi 118, and a PLMN_2 SGi 128 in some embodiments. The private MEC data center 150 is also communicatively coupled with a PLMN_1 Radio Access Network (RAN) 110, a PLMN_2 RAN 120, and a wireless local area network (WLAN) 130 over a network 140 in some embodiments.

The PLMN_1 EPC 114, the PLMN_2 EPC 124, the PLMN_1 SGi 118, the PLMN_2 SGi 128, the PLMN_1 RAN 110, and the PLMN_2 RAN 120 can be operated by PLMN service providers PLMN_1 and PLMN_2, respectively. A RAN can be a wide area network (WAN) RAN, e.g., the PLMN_1 RAN 110 or the PLMN_2 RAN 120. A WAN RAN is part of a WAN wireless telecommunication network which implements a radio access technology (RAT) that provides over the air connectivity for a mobile device. Examples of the RAT include long term evolution (LTE), LTE-Advanced (LTE-A), 5G RAT, Global System for Mobile communication (GSM), General Packet Radio Service (GPRS), Enhanced Data rates for GSM Evolution (EDGE), Interim Standard 95 (IS-95), Code Division Multiple Access (CDMA) 2000, Evolution-Data Optimized (EVDO), Universal Mobile Telecommunications System (UMTS), and the like. In many applications, a RAN includes at least one base station, e.g., the base stations 112 and 122. A base station can be a radio base station that may control all or at least some radio-related functions in a fixed part of the system. The base station can provide radio interface within their coverage area or a cell for mobile device communications. The base station or base stations can be distributed throughout the RAN to provide a wide area of coverage. The base station communicates with one or a plurality of mobile devices, other base stations, and one or more core network nodes. The base station can be a NodeB, an evolved NodeB (eNB), a next generation (i.e., 5G) NodeB, or an access point. The base station can further include a control unit connected to the core network or other radio network nodes and one or more distributed units providing radio coverage connected to the control unit.

A RAN can also be a WLAN, e.g., the WLAN 130. A WLAN is a wireless computer network that links two or more devices using wireless communication within a limited area such as a home, school, computer laboratory, or office building. A WLAN implements RAT based on Institute of Electrical and Electronics Engineers (IEEE) 802.11 protocols to provide over the air connectivity. A WLAN can also be referred to as a WiFi Network. A WLAN can include a WLAN access point (AP), e.g., WLAN AP 132, that connects with a user equipment (UE).

A RAN can also include a UE, e.g., UE 102, that communicates with the base station. A UE may include, without limitation, any of the following: computing device, mobile device, mobile electronic device, user device, user equipment device, user agent (UA), mobile station, subscriber station, portable electronic device, mobile communications device, wireless modem, wireless terminal, a mobile unit in a vehicle, a mobile device including a Universal Subscriber Identity Module (USIM) or Universal Integrated Circuit Card (UICC). Examples of a UE may include a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data, via a wireless communication network. The wireless communication network may include a wireless link over at least one of a licensed spectrum or an unlicensed spectrum. The term "UE" can also refer to any hardware or software component that can terminate a communication session for a user.

A core network, e.g., the PLMN_1 evolved packet core (EPC) 114 and the PLMN_2 EPC 124, includes one or more core network (CN) nodes that provide core network service for a respective PLMN service provider. In the illustrated example, a core network can include CN nodes such as a MME, a DNS, and a home subscriber server (HSS).

A MME, e.g., MMEs 116 and 126, is a network node that provides mobility management functions for a network operated by the respective PLMN service provider. In some cases, the MME can perform one or more functions including idle mode UE paging, bearer activation/deactivation process, attach process, ciphering/integrity protection for non-access-stratum (NAS) signaling, control plane function for mobility between the RATs, and the like. The MME can hold NAS context for a UE in an attached state. The NAS context includes a NAS security context for the UE. In some cases, for example, in a 5G network, the MME can be replaced by an SMF, an AMF, or a combination thereof.

A HSS, e.g., HSSs 117 and 127, is a network node that manages subscription information for a network operated by the respective PLMN service provider. The HSS can include a database that stores user-related and subscription-related information. The HSS can provide functionalities such as mobility management, call and session establishment support, user authentication and access authorization. In some cases, the HSS can include one or more of a Home Location Register (HLR), an Authentication Center (AuC), or a combination thereof.

In the illustrated example, a core network also includes a Domain Name System (DNS). A DNS, e.g., DNSs 115 and 125, is a network node that manages translation of domain names with Internet Protocol (IP) addresses. In some cases, the DNS can associate different nodes in a PLMN service provider's network and provide address information for locating and identifying corresponding nodes.

The example wireless communication system 100 also includes SGi nodes, e.g., PLMN_1 SGi 118 and PLMN_2 SGi 128. An SGi node is a network node that provides connectivity to an external network for the respective PLMN service provider using the SGi interface. For example, the SGi node can transmit packets over the SGi interface to a Packet Data Network (PDN) gateway of a different PLMN service provider. The SGi node can be implemented as an independent node, or as part of another network node, for example a PDN gateway.

Figure 2:
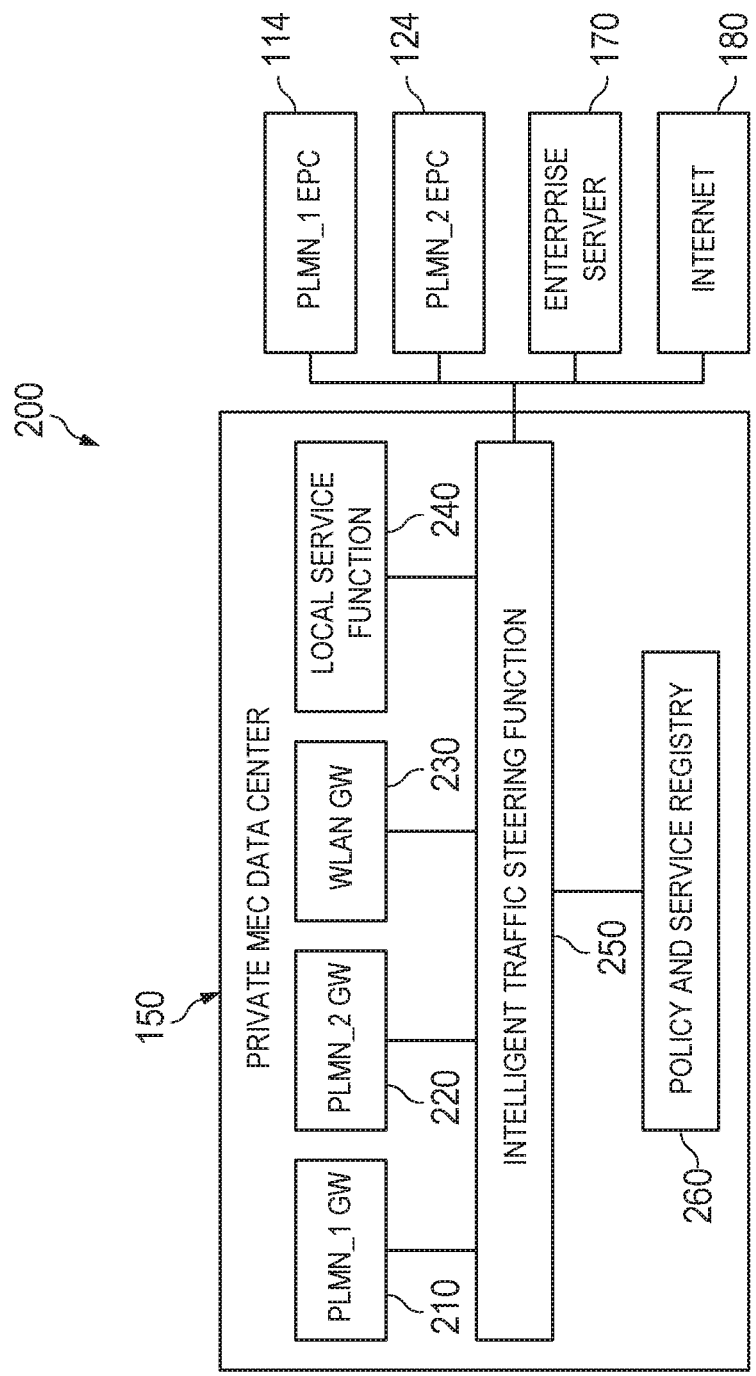
FIG. 2 is a schematic diagram illustrating example operations of a private MEC data center, according to an implementation.

The example wireless communication system 100 includes the private MEC data center 150. The private MEC data center 150 is an MEC data center that is operated by a private enterprise. The private MEC data center 150 hosts one or more virtual EPC GWs. Each virtual EPC GW corresponds to a respective PLMN service provider. In the illustrated example, the private MEC data center 150 hosts virtual EPC GW 152 corresponding to the PLMN_1 and virtual EPC GW 154 corresponding to the PLMN_2. The private MEC data center 150 can route data packets between different nodes of the same PLMN service providers. The private MEC data center 150 can also route data packets between different PLMN service providers. FIGS. 2-3 and associated descriptions provide additional details of the operations of the private MEC data center 150. In some cases, for example, in a 5G network, the virtual EPC GWs can be replaced by virtual UPFs.

The network 140 connects the private MEC data center 150 with the RANs. In some implementations, the private MEC data center 150 can be located closely with a base station or an access point of the RAN. For example, the private MEC data center 150 can be operated by an owner of a public facility such as a stadium, a convention center, or an airport. The private MEC data center 150 can be located on the premises of the public facility. The base station or the access point can also be located in or near the public facility to provide connectivity for customers of the public facility. In these or other cases, the network 140 can be a local network. Thus, the network 140 can implement wireline technologies, including e.g., coaxial, optical, or twisted pair. Alternatively, or in combination, the network 140 can implement WLAN or WAN technology.

The provisioning server 160 is a network node that can be used to provision the private MEC data center 150. For example, the provisioning server 160 can provide interface for an administrator to configure traffic policies on the private MEC data center 150. The private MEC data center 150 can route data packets according to the provisioned traffic policies. FIGS. 2-3 and associated descriptions provide additional details of the routing operations based on traffic policies.

The enterprise server 170 represents a server that provides enterprise services for the private enterprise that operates the private MEC data center 150. In some cases, the private MEC data center 150 can route data packets to or from the enterprise server 170 to provide enterprise services for the UE 102. Alternatively, or in combination, the private MEC data center 150 can route data packets to or from the Internet 180 to provide services that are available on the public Internet for the UE 102. FIGS. 2-3 and associated descriptions provide additional details of the routing operations for data packets.

In one example operation, the private MEC data center 150 receives a data packet. The data packet can be transmitted to the private MEC data center 150 from one of the network nodes operated by PLMN_1 or PLMN_2. The private MEC data center 150 identifies a traffic routing type for the data packet. The private MEC data center 150 transmits the data packet based on the identified traffic routing type. The data packet can be transmitted to another network node operated by PLMN_1 or PLMN_2, the enterprise server 170, the Internet 180, or between VNFs in the private MEC data center 150. FIGS. 2-3 and associated descriptions provide additional details of these implementations.

Figure 4:
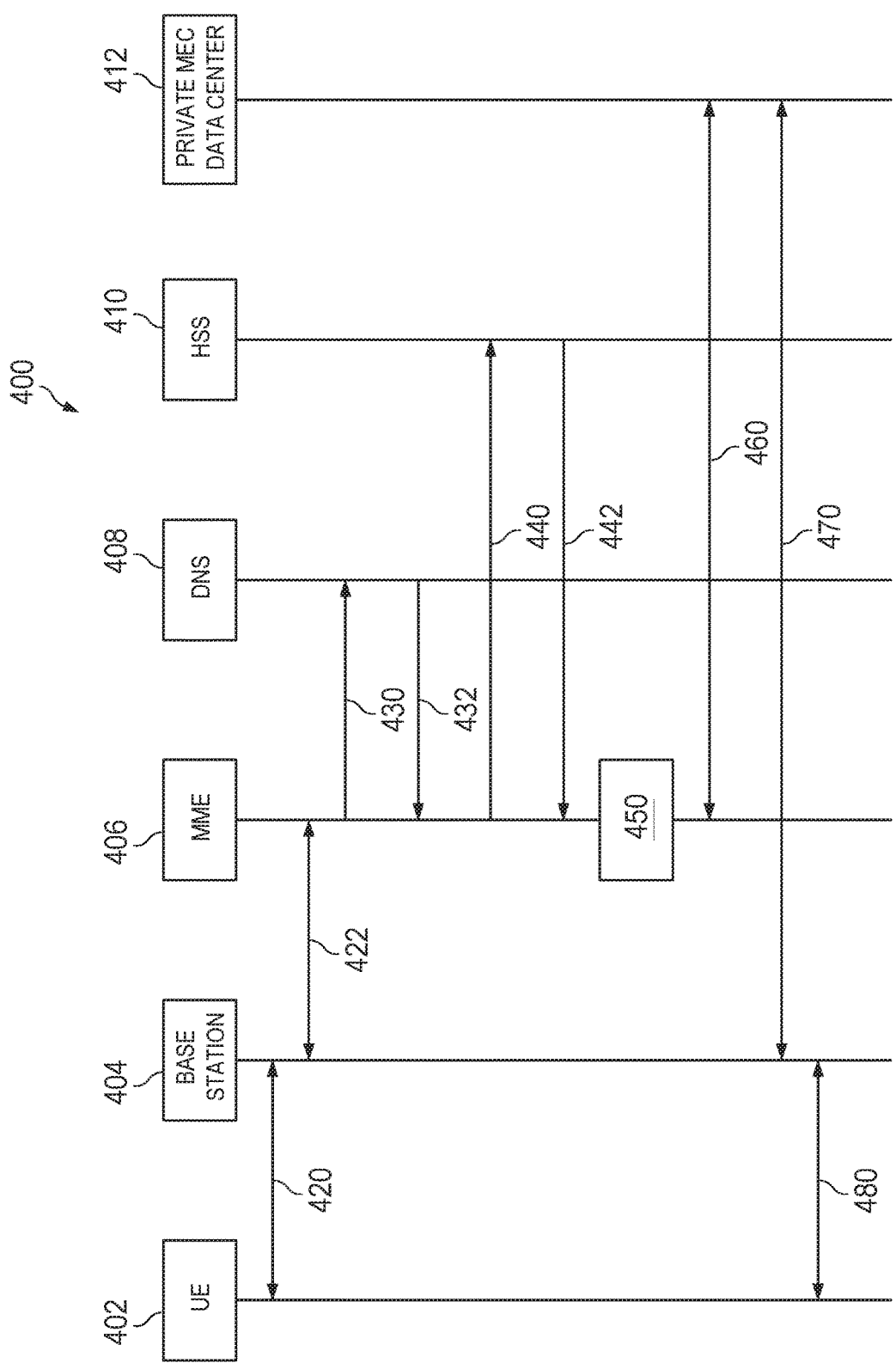
FIG. 4 is a flow diagram illustrating an example process for selecting a virtual Evolved Packet Core (EPC) gateway (GW), according to an implementation.

In another example operation, a MME, e.g., the MME 116, can query a respective DNS operated by the same PLMN service provider, e.g., the DNS 115, to obtain a list of EPC GWs in response to a request for attachment. The MME can further query a respective HSS operated by the same PLMN service provider, e.g., the HSS 127, to receive subscription information of a UE requesting the attachment. The MME can select a virtual EPC GW hosted by the private MEC data center 150 based on the responses of these queries and instruct the private MEC data center 150 to complete the attachment procedure. FIG. 4 and associated descriptions provide additional details of these implementations.

While elements of FIG. 1 are shown as including various component parts, portions or modules that implement the various features and functionality, nevertheless these elements may instead include a number of sub-modules, third-party services, components, libraries, and such, as appropriate. Furthermore, the features and functionality of various components can be combined into fewer components, as appropriate.

FIG. 2 is a schematic diagram 200 illustrating example operations of a private MEC data center, according to an implementation. As illustrated, the diagram 200 includes the private MEC data center 150 that communicates with the EPCs of multiple PLMN service providers, e.g., the PLMN_1 EPC 114 and the PLMN_2 EPC 124. The MEC data center 150 also communicates with the enterprise server 170 and the Internet 180.

As discussed previously, the private MEC data center 150 can host virtual EPC GWs for multiple PLMN service providers. In the illustrated example, the private MEC data center 150 hosts PLMN_1 GW 210, and PLMN_2 GW 220, which are VNFs implementing EPC GW functionalities for PLMN_1 and PLMN_2, respectively. In some implementations, the PLMN_1 GW 210 and the PLMN_2 GW 220 can be controlled by the PLMN service providers PLMN_1 and PLMN_2, respectively. For example, PLMN_1 and PLMN_2 can provide software images for the PLMN_1 GW 210 and the PLMN_2 GW 220 to the private MEC data center 150. These software images can be executed on the private MEC data center 150. The private MEC data center 150 also hosts WLAN GW 230, which is a VNF implementing GW functionalities for a WLAN. The PLMN_1 GW 210, the PLMN_2 GW 220, and the WLAN GW 230 are configured to process user plane data traffic for PLMN_1, PLMN_2, and the WLAN, respectively. Providing a VNF for WLAN GW functionality can enable the private enterprise to provide the same services to WLAN users as users who subscribe to PLMN service providers.

The private MEC data center 150 also includes one or more local service functions 240. The local service function 240 represents an application, set of applications, software, software modules, hardware, or any combinations thereof that can be configured to provide services offered by the private enterprise that controls the operations of the private data center 150. In one example, the private enterprise can be a stadium owner, and the private enterprise can offer streaming service that shows scores and highlights of sporting events in the stadium through a local service function 240. In another example, the private enterprise can be an airport owner, and the private enterprise can offer interactive services for travelers to check-in through another local service function 240. Hosting the local service function 240 with the virtual EPC GWs on the same private MEC data center 150 can provide one or more advantages. For example, this approach shortens the data traffic path between the GWs and the source of the data, and therefore reduces latency and improves user experience.

The private MEC data center 150 also includes a Policy & Service Registry (PSR) 260. The PSR 260 represents an application, set of applications, software, software modules, hardware, or any combinations thereof that can be configured to store traffic policies. The traffic polices can indicate how data traffic is routed among the components within the private MEC data center 150, between the components within the private MEC data center 150 and components outside of the private MEC data center 150, or a combination thereof. In one example, the traffic policy can include a rate limiting policy, which can indicate a peak data rate for transmitting the data traffic. In another example, the traffic policy can be a metering policy, which can indicate a total volume of data traffic that has been provisioned for a particular type of data traffic within a time period. In yet another example, the traffic policy can include a combination of the rate limiting policy and the metering policy, which indicate a reduction of a peak data rate if the total volume of data traffic has exceeded a threshold. In yet another example, the traffic policy can include an access policy, which can indicate whether a particular resource or service, e.g., a service provided by the local service function 240, can be accessed. The traffic policy can be individual or aggregated over time. The traffic policy can also be provisioned for a specific user, a specific PLMN provider, or both. In some implementations, the PSR 260 can also store address information, e.g., Internet Protocol (IP) addresses, of the VNFs executing on the private MEC data center 150 and entities outside of the private MEC data center 150. In some cases, the PSR 260 can also store resource configuration policies for the VNFs executing on the private MEC data center 150. For example, the PSR 260 can include provisioning rules indicating how many hardware or software resources each VNF, e.g., the PLMN_1 GW 210 and the PLMN_2 GW 220, can use. In some cases, a new functionality can be added to the private MEC data center 150. The new functionality can be a new local service provided by the local service function 240. The new functionality can also be a new traffic routing type for data packets received at the private MEC data center 150. In these cases, the new functionality can be registered with the PSR 260. Accordingly, the ITSF 250 can retrieve the information stored at the PSR 260, and use the information to route the data packets.

The private MEC data center 150 also includes an Intelligent Traffic Steering Function (ITSF) 250. The ITSF 250 represents an application, set of applications, software, software modules, hardware, or any combinations thereof that can be configured to route data packets for the private MEC data center 150. The ITSF 250 can interact with the PSR 260 to retrieve the address information of different VNFs in the private MEC data center 150 to perform the routing. The ITSF 250 can route data packets among the VNFs in the private MEC data center 150, including e.g., the PLMN_1 GW 210, the PLMN_2 GW 220, the WLAN GW 230, and the local service function 240. The ITSF 250 can also route the data packets between any of the VNFs in the private MEC data center 150 and components outside of the private MEC data center 150, including, e.g., the PLMN_1 EPC 114, the PLMN_2 EPC 124, the enterprise server 170, and the Internet 180.

The ITSF 250 can also interact with the PSR 260 to retrieve the traffic policy for a particular user or a particular PLMN and enforce the traffic policy. For example, the ITSF 250 can limit the peak data rate for transmitting data packets for a particular user, based on a rate limiting policy associated with the particular user.

In some implementations, the ITSF 250 can perform deep packet inspection (DPI) on a data packet before routing the data packet. For example, the ITSF 250 can inspect the data packet to identify a traffic routing type for the data packet, and route the data packet according to the traffic routing type. Examples of the traffic routing type include pass-through traffic, local user plane traffic, S11 control plane traffic, local service virtualized network function (VNF) traffic, Selected IP Traffic Offload (SIPTO) traffic, and inter-operator traffic. FIGS. 3A-3F and associated descriptions provide additional details of these routing operations. Alternatively, or in combination, the ITSF 250 can also inspect the data packet to identify a user, a PLMN service provider, or both, that are associated with the data packet, and enforce traffic policy accordingly. In some cases, the ITSF 250 can inspect the data packet by examining one or more fields in a header of the packet.

Figure 3A:
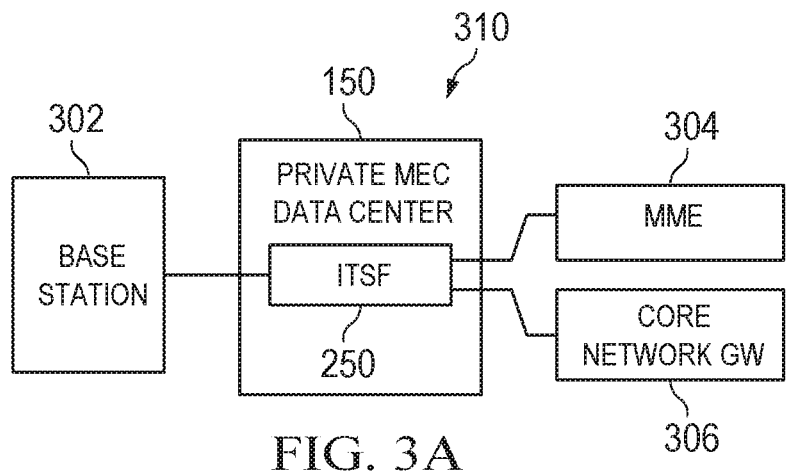
FIG. 3A is a schematic diagram illustrating an example routing operation of a pass-through traffic data packet, according to an implementation.

FIG. 3A is a schematic diagram 310 illustrating an example routing operation of a pass-through traffic data packet, according to an implementation. A pass-through traffic data packet represents a data packet transmitted between a base station 302 and a core network node such as a MME 304 or a core network GW 306. The base station 302, the MME 304, and the core network GW 306 are outside of the private MEC data center 150, and are owned and operated by a PLMN service provider. The data packet can be a control plane message transmitted to or from the MME 304, such as an S1-MME message. The data packet can also be a user plane data traffic packet transmitted to or from the core network GW 306, such as an S1-U data packet. In these cases, the ITSF 250 can inspect the data packet, identify the traffic routing type as pass-through traffic, e.g., by determining that the data packet is an S1-MME message or a S1-U data packet to or from the core network GW 306, and route the data packet accordingly.

Figure 3B:
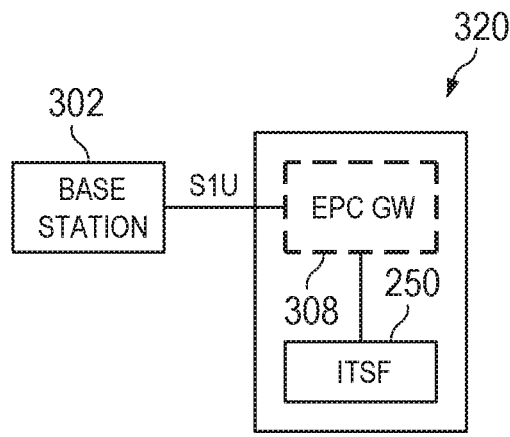
FIG. 3B is a schematic diagram illustrating an example routing operation of a local user plane traffic data packet, according to an implementation.

FIG. 3B is a schematic diagram 320 illustrating an example routing operation of a local user plane traffic data packet, according to an implementation. A local user plane traffic data packet represents a data packet transmitted between the base station 302 and a virtual EPC GW 308 in the private MEC data center 150. The base station 302 and the virtual EPC GW 308 correspond to the same PLMN service provider. In these cases, the data packet can include a fully qualified Tunnel endpoint identifier (F-TEID) that identifies the particular virtual EPC GW 308. By examining the F-TEID, the ITSF 250 can determine the traffic routing type as local user plane traffic, and route the data packet accordingly.

Figure 3C:
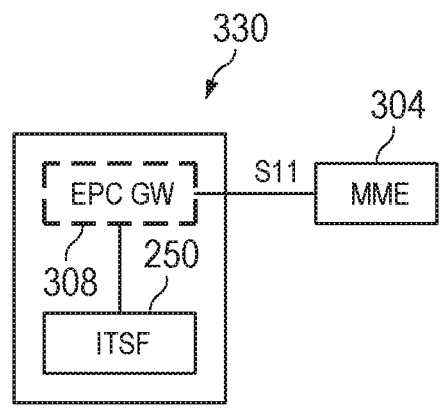
FIG. 3C is a schematic diagram illustrating an example routing operation of an S11 control plane traffic data packet, according to an implementation.

FIG. 3C is a schematic diagram 330 illustrating an example routing operation of an S11 control plane traffic data packet, according to an implementation. An S11 control plane traffic data packet represents a data packet transmitted between the virtual EPC GW 308 and the MME 304. The virtual EPC GW 308 and the MME 304 correspond to the same PLMN service provider. In these cases, the data packet can include the destination address of the packet, e.g., the virtual EPC GW 308 or the MME 304. By examining the data packet, e.g., the header, the ITSF 250 can determine the traffic routing type as S11 control plane traffic, and route the data packet accordingly.

Figure 3D:
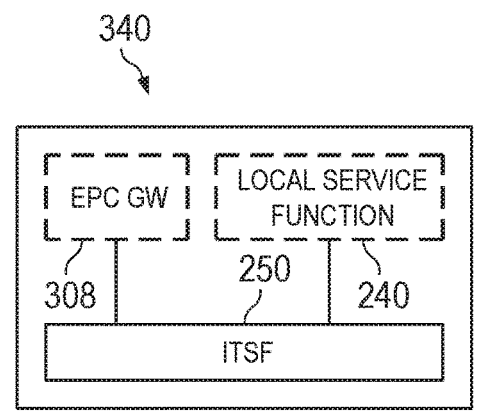
FIG. 3D is a schematic diagram illustrating an example routing operation of a local service VNF traffic data packet, according to an implementation.

FIG. 3D is a schematic diagram 340 illustrating an example routing operation of a local service VNF traffic data packet, according to an implementation. A local service VNF traffic data packet represents a data packet transmitted between the virtual EPC GW 308 and the local service function 240. In these cases, the data packet can include Internet Protocol (IP) packets. By examining the header of the data packet, the ITSF 250 can determine the traffic routing type as local service VNF traffic, and route the data packet accordingly.

Figure 3E:
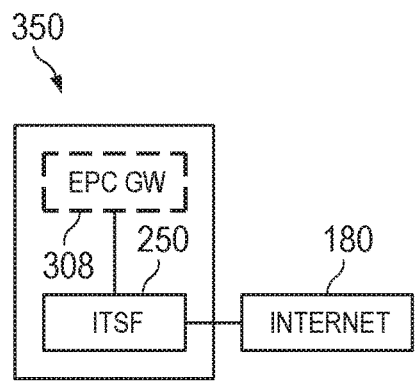
FIG. 3E is a schematic diagram illustrating an example routing operation of a SIPTO data packet, according to an implementation.

FIG. 3E is a schematic diagram 350 illustrating an example routing operation of a SIPTO data packet, according to an implementation. A SIPTO data packet represents a data packet transmitted between the virtual EPC GW 308 and the Internet 180. In these cases, the data packet is formatted as Internet Protocol (IP) packets. By examining the header of the data packet, the ITSF 250 can determine the traffic routing type as SIPTO. In some cases, the ITSF 250 can also determine whether the packet has a local address. If the packet has a local address, the ITSF 250 can route the packet to the local service function 240. Otherwise the ITSF 250 can route the data packet to the Internet 180.

Figure 3F:
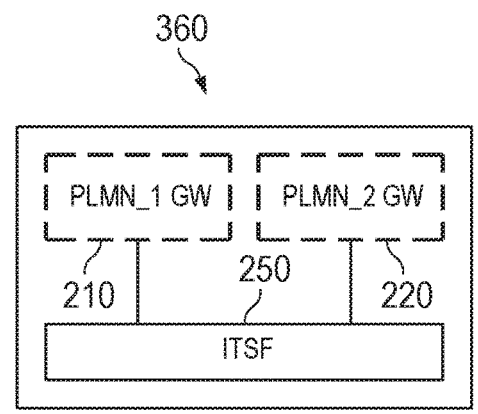
FIG. 3F is a schematic diagram illustrating an example routing operation of an inter-operator traffic data packet, according to an implementation.

FIG. 3F is a schematic diagram 360 illustrating an example routing operation of an inter-operator traffic data packet, according to an implementation. An inter-operator traffic data packet represents a data packet transmitted between virtual EPC GWs of two PLMN service providers, e.g., the PLMN_1 GW 210 and the PLMN_2 GW 220. In one example, a user of PLMN_1 and a user of PLMN_2 may be at the same location, e.g., in the same stadium, and are communicating with each other. Therefore, the PLMN_1 GW 210 serves as the local EPC GW for the PLMN_1 user, and the PLMN_2 GW 220 serves as the local EPC GW for the PLMN_2 user. By inspecting the data packet, the ITSF 250 can determine the traffic routing type as inter-operator traffic, identify the virtual EPC GWs for the data packet, and route the data packet accordingly.

FIG. 4 is a flow diagram illustrating an example process 400 for selecting a virtual EPC GW, according to an implementation. For clarity of presentation, the description that follows generally describes process 400 in the context of the other figures in this description. In the illustrated example, the process 400 is performed by a UE 402, a base station 404, a MME 406, a DNS 408, a HSS 410, and a private MEC data center 412. The base station 404, the MME 406, the DNS 408, and the HSS 410 can be owned and operated by a PLMN service provider. The private MEC data center 412 can be owned and operated by a private enterprise. As discussed previously, the private MEC data center 412 can host one or more virtual EPC GWs, each corresponding to a different PLMN service provider. In the illustrated example, one of the virtual EPC GWs hosted on the private MEC data center 412 corresponds to the PLMN service provider that operates the base station 404, the MME 406, and the HSS 410. However, it will be understood that process 400 may be performed, for example, by any suitable system, environment, software, and hardware, or a combination of systems, environments, software, and hardware, as appropriate. In some implementations, various steps of process 400 can be run in parallel, in combination, in loops, or in any order.

The process begins at 420, where the UE 402 and the base station 404 initiate an attach procedure. The attach procedure can be initiated by one or more signaling messages exchanged between the UE 402 and the base station 404. In some cases, the one or more signaling messages can be formatted according to protocols specified in 3rd Generation Partnership Project (3GPP) standards.

At 422, the base station 404 and the MME 406 continue the attach procedure. The attach procedure can be continued by one or more signaling messages exchanged between the MME 406 and the base station 404. The one or more signaling messages can include an attach request message that is received at the MME 406. The attach request message indicates that the UE 402 requests to establish a connection with the core network of the PLMN service provider. In some cases, the one or more signaling messages can be formatted according to 3GPP standards protocols. For example, the attach request message can be an attach request specified in 3GPP standards.

In some operations, some of the signaling messages for the step 422 can be exchanged before, after, or during some of the signaling messages for the step 420.

At 430, in response to the attach request message, the MME 406 begins an EPC GW selection procedure by transmitting a query to the DNS 408. The query message can include an identification of the base station 404 that the UE initiates the attach procedure with.

At 432, the DNS 408 transmits a query response in response to the query. The query response can include a list of EPC GW candidates. In some cases, the query response can also include a weighting factor for each EPC GW candidate in the list. The weighting factor can indicate a suitability for the corresponding EPC GW candidate. In one example, the weighting factor can be determined by the proximity between the base station 404 and the respective EPC GW candidate. For example, a higher weighting factor can be assigned to the EPC GW candidate that is closer to the base station 404, in terms of the geographic distance, the length of the signaling transmission path, or a combination thereof. The higher weighting factor can indicate that the respective EPC GW candidate is more suitable for selection. In some cases, the weighting factor or the weighting algorithm can be determined or provisioned by the PLMN service provider that controls the MME 406. In the illustrated example, the virtual EPC GW hosted in the private MEC data center 412 is assigned the highest weighting factor. The virtual EPC GW can be assigned the weighting factor because the private MEC data center 412 is closest to the base station 404. Alternatively, or in combination, the virtual EPC GW can be assigned the weighting factor because the PLMN service provider prioritizes the virtual EPC GW hosted in the private MEC data center 412 through provisioning.

At 440, in response to the indication that the virtual EPC GW hosted in the private MEC data center 412 has the highest weighting factor, the MME 406 transmits a subscription information request to the HSS 410. The subscription information request can include an identification of the UE 402, an identification of the base station 404, or a combination thereof. At 442, the HSS 410 transmits a subscription information response to the MME 406. The subscription information response can indicate whether the UE 402 has a subscription for the private enterprise that operates the private MEC data center 412.

In some implementations, the HSS 410 can use the identification of the UE 402 that is included in the subscription information request to identify the UE 402 and retrieve subscription information associated with the UE 402. The HSS 410 can include part of all of the retrieved subscription information associated with the UE 402 in the subscription information response. In some cases, the HSS 410 can provide subscription information for multiple private MEC data centers. In these cases, different private MEC data centers can be associated with different base stations. The HSS 410 can identify a particular private MEC data center, e.g., the private MEC data center 412, based on the identification of the base station 404 that is included in the subscription information request, and retrieve subscription information for the private MEC data center 412.

At 450, the MME 406 performs an EPC GW selection. In the illustrated example, the MME 406 determines that the virtual EPC GW hosted in the private MEC data center 412 is the most suitable EPC GW candidate, e.g., based on the query response received at 432. The MME 406 also determines that the UE 402 that requests the attachment has subscribed to the private enterprise operating the private MEC data center 412, e.g., based on the subscription information response received at 442. Accordingly, the MME 406 selects the virtual EPC GW hosted in the private MEC data center 412. If the UE 402 does not have subscription for the private enterprise operating the private MEC data center 412, the MME 406 can select the next suitable EPC GW candidate listed in the query response.

At 460, the MME 406 and the private MEC data center 412 initiate an EPC GW attachment procedure. The EPC GW attach procedure can be initiated by one or more signaling messages exchanged between the MME 406 and the private MEC data center 412. The one or more signaling messages can include an EPC GW attach request that indicates the particular virtual EPC GW to be attached. In response to the EPC GW attach request, the private MEC data center 412 attaches the particular virtual EPC GW with the UE 402. In some cases, the one or more signaling messages can be formatted according to 3GPP standards protocols. For example, the EPC GW attach request can be an UE attach request specified in 3GPP standards.

At 470, the private MEC data center 412 exchanges signaling messages with the base station 404 to perform the attachment operations. At 480, the base station 404 exchanges signaling messages with the UE 402 to perform the attachment operations. In some operations, some of the signaling messages for the step 470 can be exchanged before, after, or during some of the signaling messages for the step 480. In some cases, the signaling messages for the steps 470 and 480 can be formatted according to 3GPP standards protocols.

Figure 5:
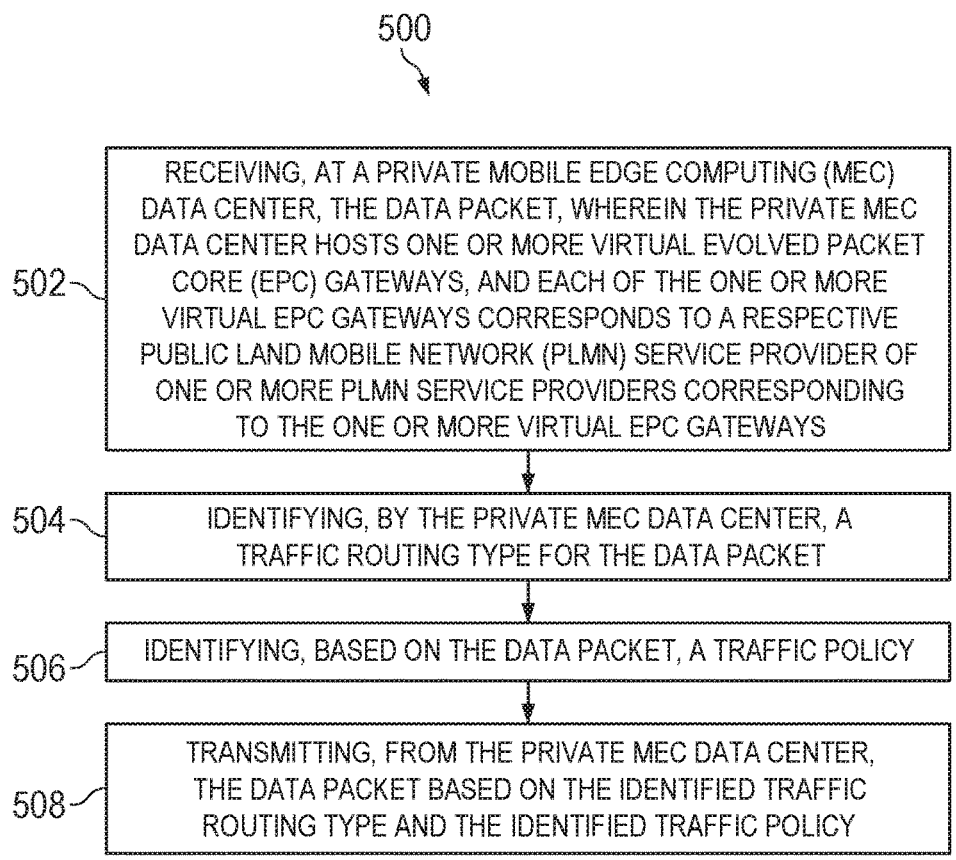
FIG. 5 is a flowchart illustrating an example method for routing data packets, according to an implementation.

FIG. 5 is a flowchart illustrating an example method 500 for routing data packets, according to an implementation. The method 500 can be implemented by a private MEC data center, e.g., the private MEC data center 150 shown in FIG. 1. The method 500 can also be implemented using additional, fewer, or different entities. Furthermore, the method 500 can also be implemented using additional, fewer, or different operations, which can be performed in the order shown or in a different order. In some instances, an operation or a group of operations can be iterated or repeated, for example, for a specified number of iterations or until a terminating condition is reached.

The example method 500 begins at 502, where a private MEC data center receives a data packet. The private MEC data center hosts one or more virtual EPC gateways, each of the one or more virtual EPC gateways corresponding to a respective PLMN service provider of one or more PLMN service providers corresponding to the one or more virtual EPC gateways. At 504, the private MEC data center identifies a traffic routing type for the data packet. At 506, the private MEC data center identifies a traffic policy based on the data packet. At 508, the private MEC data center transmits the data packet based on the identified traffic routing type and the identified traffic policy.

Figure 6:
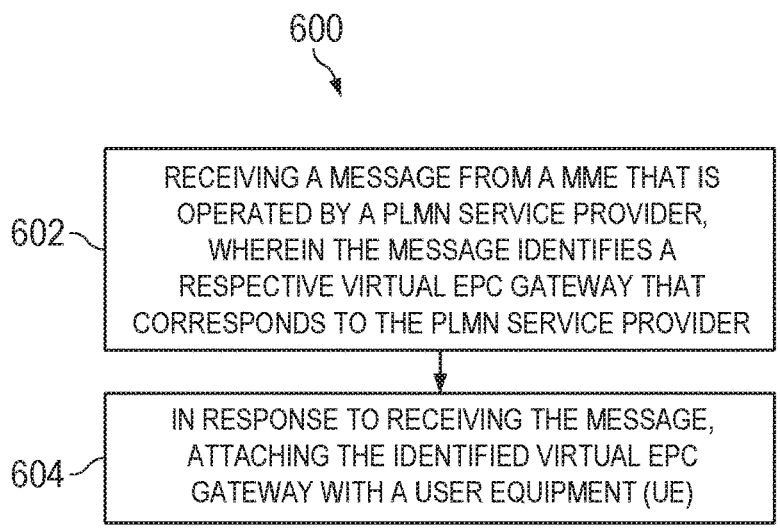
FIG. 6 is a flowchart illustrating an example method for selecting a virtual EPC GW, according to an implementation.

FIG. 6 is a flowchart illustrating an example method 600 for selecting a virtual EPC GW, according to an implementation. The method 600 can be implemented by a private MEC data center, e.g., the private MEC data center 150 shown in FIG. 1. The method 600 can also be implemented using additional, fewer, or different entities. Furthermore, the method 600 can also be implemented using additional, fewer, or different operations, which can be performed in the order shown or in a different order. In some instances, an operation or a group of operations can be iterated or repeated, for example, for a specified number of iterations or until a terminating condition is reached.

The example method 600 begins at 602, where the private MEC data center receives a message from a MME. The MME is operated by a PLMN service provider. The message identifies a respective virtual EPC gateway that corresponds to the PLMN service provider. At 604, in response to receiving the message, the private MEC data center attaches the identified virtual EPC gateway with a UE.

Figure 7:
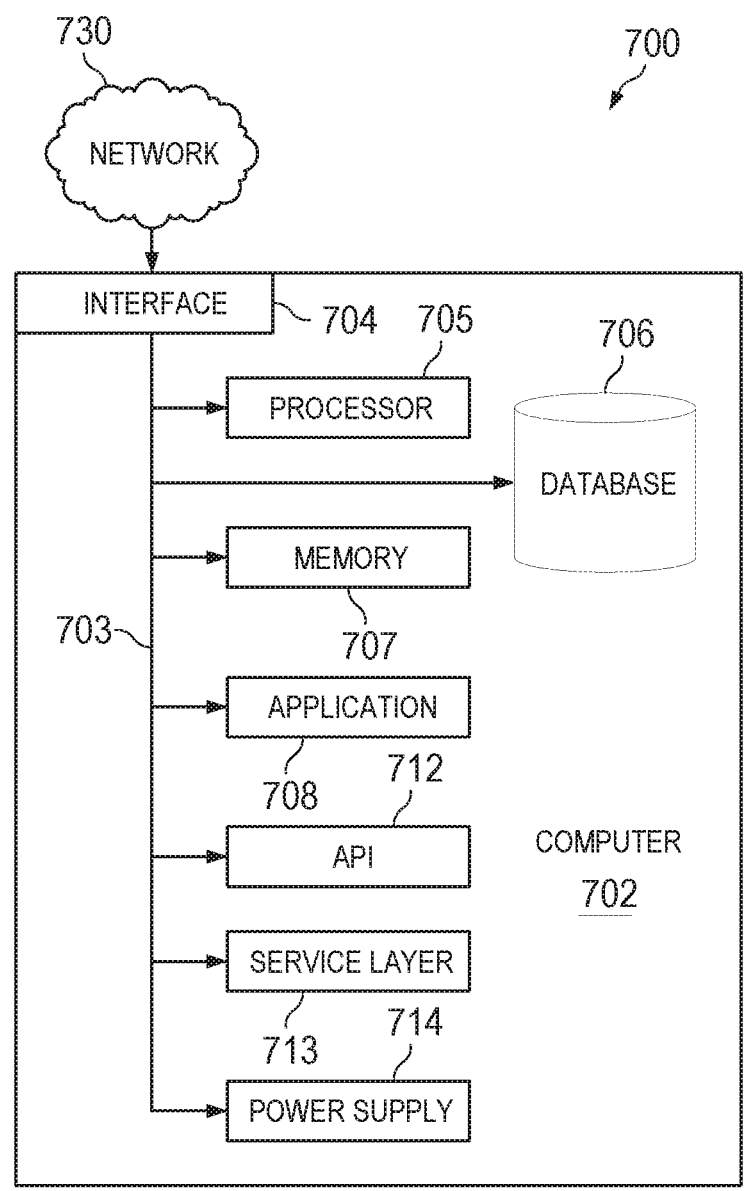
FIG. 7 is a block diagram of an example computer system used to provide computational functionalities associated with described algorithms, methods, functions, processes, flows, and procedures, as described in the instant disclosure, according to an implementation.

FIG. 7 is a block diagram of an example computer system 700 used to provide computational functionalities associated with described algorithms, methods, functions, processes, flows, and procedures, as described in the instant disclosure, according to an implementation. The computer system 700, or more than one computer system 700, can be used to implement the private MEC data center described previously in this disclosure. The computer system 700, or more than one computer system 700, can also be used to implement a network node operated by a PLMN service provider described previously in this disclosure.

The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a graphical user interface (GUI).

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, or other server (or a combination of servers).

The computer 702 can receive requests over network 730 from a client application (for example, executing on another computer 702) and respond to the received requests by processing the received requests using an appropriate software application(s). In addition, requests may also be sent to the computer 702 from internal users (for example, from a command console or by other appropriate access methods), external or third-parties, other automated applications, as well as any other appropriate entities, individuals, systems, or computers.

Each of the components of the computer 702 can communicate using a system bus 703. In some implementations, any or all of the components of the computer 702, hardware or software (or a combination of both hardware and software), may interface with each other or the interface 704 (or a combination of both), over the system bus 703 using an application programming interface (API) 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined functionalities through a defined interface. For example, the interface may be software written in JAVA, C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems that are connected to the network 730 (whether illustrated or not) in a distributed environment. Generally, the interface 704 includes logic encoded in software or hardware (or a combination of software and hardware) and is operable to communicate with the network 730. More specifically, the interface 704 may include software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a database 706 that can hold data for the computer 702 or other components (or a combination of both) that can be connected to the network 730 (whether illustrated or not). For example, database 706 can be an in-memory, conventional, or other type of database storing data consistent with this disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases (of the same or combination of types) can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702 or other components (or a combination of both) that can be connected to the network 730 (whether illustrated or not). For example, memory 707 can be random access memory (RAM), read-only memory (ROM), optical, magnetic, and the like, storing data consistent with this disclosure. In some implementations, memory 707 can be a combination of two or more different types of memory (for example, a combination of RAM and magnetic storage) according to particular needs, desires, or particular implementations of the computer 702 and the described functionality. Although illustrated as a single memory 707 in FIG. 7, two or more memories 707 (of the same or combination of types) can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in this disclosure. For example, application 708 can serve as one or more components, modules, or applications. Further, although illustrated as a single application 708, the application 708 may be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or other power management functionality). In some implementations, the power supply 714 can include a power plug to allow the computer 702 to be plugged into a wall socket or other power source to, for example, power the computer 702 or recharge a rechargeable battery.

There may be any number of computers 702 associated with, or external to, a computer system containing computer 702, each computer 702 communicating over network 730. Further, the term "client," "user," and other appropriate terminology may be used interchangeably, as appropriate, without departing from the scope of this disclosure. Moreover, this disclosure contemplates that many users may use one computer 702, or that one user may use multiple computers 702.

Figure 8:
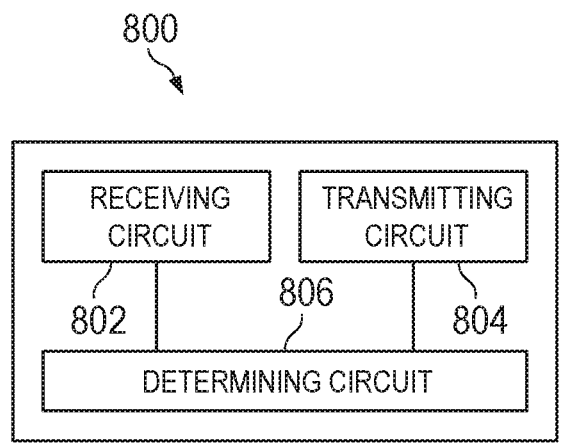
FIG. 8 is a schematic diagram illustrating an example structure of a private MEC data center described in the present disclosure, according to an implementation.

FIG. 8 is a schematic diagram illustrating an example structure of a private MEC data center 800 described in the present disclosure, according to an implementation. The private MEC data center 800 includes a receiving circuit 802, a transmitting circuit 804, and a determining circuit 806. The determining circuit 806 may be coupled to or capable of communicating with the receiving circuit 802 and the transmitting circuit 804. In some implementations, the private MEC data center 800 can further include one or more circuits for performing any one or combination of steps described in the present disclosure.

The receiving circuit 802 is configured to receive a data packet. The data packet can be received from a base station, a MME, or any other network nodes operated by a PLMN service provider.

The determining circuit 806 is configured to identify a traffic routing type for the data packet. The traffic routing type can be at least one of pass-through traffic, local user plane traffic, S11 control plane traffic, local service virtualized network function (VNF) traffic, Selected IP Traffic Offload (SIPTO) traffic, or inter-operator traffic. In some cases, the determining circuit 806 is also configured to identify a traffic policy based on the data packet. The traffic policy can be identified further based on a PLMN service provider or a UE associated with the data packet. The traffic policy can include at least one of a rate limiting policy or a metering policy.

The transmitting circuit 804 is configured to transmit the data packet based on the identified traffic routing type. In some cases, the data packet is transmitted according to the determined traffic policy.

The receiving circuit 802 can also be configured to receive a message from a MME that is operated by a PLMN service provider. The message identifies a respective virtual EPC gateway that corresponds to the PLMN service provider.

In response to receiving the message, the determining circuit 806 can be configured to attach the identified virtual EPC gateway with a UE.

Figure 9:
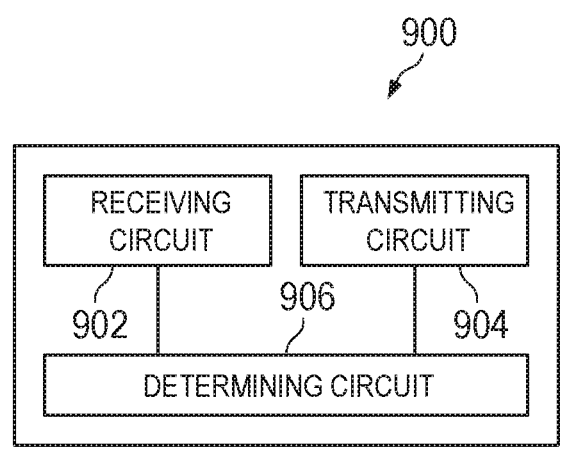
FIG. 9 is a schematic diagram illustrating an example structure of a Mobility Management Entity (MME) described in the present disclosure, according to an implementation.

FIG. 9 is a schematic diagram illustrating an example structure of a MME 900 described in the present disclosure, according to an implementation. The MME 900 includes a receiving circuit 902, a transmitting circuit 904, and a determining circuit 906. The determining circuit 906 may be coupled to or capable of communicating with the receiving circuit 902 and the transmitting circuit 904. In some implementations, the MME 900 can further include one or more circuits for performing any one or combination of steps described in the present disclosure.

The receiving circuit 902 is configured to receive an attach request message from a base station, a query response for EPC GW candidates from a DNS, and/or a subscription information response from an HSS.

The transmitting circuit 904 is configured to transmit a query for EPC GW candidates to a DNS and/or a subscription information request to an HSS.

The determining circuit 906 is configured to select a virtual EPC GW hosted on a private MEC data center for attachment. The selection can be based on the received query response for EPC GW candidates from the DNS and the subscription information response from the HSS. In response to the selection, the transmitting circuit 904 is configured to transmit a message to the private MEC data center to initiate the attachment.

Described implementations of the subject matter can include one or more features, alone or in combination.

In a first implementation, a computer-implemented method for processing a data packet in a communication network includes: receiving, at a private Mobile Edge Computing (MEC) data center, the data packet, where the private MEC data center hosts one or more virtual Evolved Packet Core (EPC) gateways, and each of the one or more virtual Evolved Packet Core (EPC) gateways corresponds to a respective Public Land Mobile Network (PLMN) service provider of one or more PLMN service providers corresponding to the one or more virtual EPC gateways; identifying, by the private MEC data center, a traffic routing type for the data packet; and transmitting, from the private MEC data center, the data packet based on the identified traffic routing type.

The foregoing and other described implementations can each, optionally, include one or more of the following features.

A first feature, combinable with any of the previous or following features, where the private MEC data center is communicatively coupled with a base station that is operated by a PLMN service provider, the data packet is received from the base station and transmitted to a virtual EPC gateway corresponding to the PLMN service provider.

A second feature, combinable with any of the previous or following features, where the private MEC data center is communicatively coupled with a Mobility Management Entity (MME) that is operated by a PLMN service provider, the data packet is generated by a virtual EPC gateway corresponding to the PLMN service provider and transmitted to the MME.

A third feature, combinable with any of the previous or following features, where the traffic routing type is pass-through traffic, local user plane traffic, S11 control plane traffic, local service virtualized network function (VNF) traffic, Selected IP Traffic Offload (SIPTO) traffic, or inter-operator traffic.

A fourth feature, combinable with any of the previous or following features, where the method further includes: identifying, based on the data packet, a traffic policy; and transmitting the data packet according to the traffic policy and based on the identified traffic routing type.

A fifth feature, combinable with any of the previous or following features, where the traffic policy is identified based on the data packet and based on a PLMN service provider or a user equipment (UE) associated with the data packet.

A sixth feature, combinable with any of the previous or following features, where the traffic policy includes at least one of a rate limiting policy or a metering policy.

A seventh feature, combinable with any of the previous features, where the method further includes: receiving a message from a MME operated by a particular corresponding PLMN service provider, wherein the message identifies a virtual EPC gateway corresponding to the PLMN service provider; and in response to receiving the message, attaching the identified virtual EPC gateway with a user equipment (UE).

In a second implementation, a private Mobile Edge Computing (MEC) data center, includes a non-transitory memory storage comprising instructions; and one or more hardware processors in communication with the memory storage, where the one or more hardware processors execute the instructions to: receive, at the private Mobile Edge Computing (MEC) data center, the data packet, where the private MEC data center hosts one or more virtual Evolved Packet Core (EPC) gateways, and each of the one or more virtual Evolved Packet Core (EPC) gateways corresponds to a respective Public Land Mobile Network (PLMN) service provider of one or more PLMN service providers corresponding to the one or more virtual EPC gateways; identify, by the private MEC data center, a traffic routing type for the data packet; and transmit, from the private MEC data center, the data packet based on the identified traffic routing type.

The foregoing and other described implementations can each, optionally, include one or more of the following features.

A first feature, combinable with any of the previous or following features, where the private MEC data center is communicatively coupled with a base station that is operated by a PLMN service provider, the data packet is received from the base station and transmitted to a virtual EPC gateway corresponding to the PLMN service provider.

A second feature, combinable with any of the previous or following features, where the private MEC data center is communicatively coupled with a Mobility Management Entity (MME) that is operated by a PLMN service provider, the data packet is generated by a virtual EPC gateway corresponding to the PLMN service provider and transmitted to the MME.

A third feature, combinable with any of the previous or following features, where the traffic routing type is pass-through traffic, local user plane traffic, S11 control plane traffic, local service virtualized network function (VNF) traffic, Selected IP Traffic Offload (SIPTO) traffic, or inter-operator traffic.

A fourth feature, combinable with any of the previous or following features, where the one or more hardware processors execute the instructions to: identify, based on the data packet, a traffic policy; and transmitting the data packet according to the traffic policy and based on the identified traffic routing type.

A fifth feature, combinable with any of the previous or following features, where the traffic policy is identified based on the data packet and based on a PLMN service provider or a user equipment (UE) associated with the data packet.

A sixth feature, combinable with any of the previous or following features, where the traffic policy includes at least one of a rate limiting policy or a metering policy.

A seventh feature, combinable with any of the previous features, where the one or more hardware processors execute the instructions to: receive a message from a MME operated by a particular corresponding PLMN service provider, wherein the message identifies a virtual EPC gateway corresponding to the PLMN service provider; and in response to receiving the message, attaching the identified virtual EPC gateway with a user equipment (UE).

In a third implementation, a non-transitory computer-readable medium storing computer instructions for processing a data packet in a communication network, that when executed by one or more hardware processors, cause the one or more hardware processors of a router to perform operations including: receiving, at a private Mobile Edge Computing (MEC) data center, the data packet, where the private MEC data center hosts one or more virtual Evolved Packet Core (EPC) gateways, and each of the one or more virtual Evolved Packet Core (EPC) gateways corresponds to a respective Public Land Mobile Network (PLMN) service provider of one or more PLMN service providers corresponding to the one or more virtual EPC gateways; identifying, by the private MEC data center, a traffic routing type for the data packet; and transmitting, from the private MEC data center, the data packet based on the identified traffic routing type.

The foregoing and other described implementations can each, optionally, include one or more of the following features.

A first feature, combinable with any of the previous or following features, where the private MEC data center is communicatively coupled with a base station that is operated by a PLMN service provider, the data packet is received from the base station and transmitted to a virtual EPC gateway corresponding to the PLMN service provider.

A second feature, combinable with any of the previous or following features, where the private MEC data center is communicatively coupled with a Mobility Management Entity (MME) that is operated by a PLMN service provider, the data packet is generated by a virtual EPC gateway corresponding to the PLMN service provider and transmitted to the MME.

A third feature, combinable with any of the previous or following features, where the traffic routing type is pass-through traffic, local user plane traffic, S11 control plane traffic, local service virtualized network function (VNF) traffic, Selected IP Traffic Offload (SIPTO) traffic, or inter-operator traffic.

A fourth feature, combinable with any of the previous or following features, where the operations further include: identifying, based on the data packet, a traffic policy; and transmitting the data packet according to the traffic policy and based on the identified traffic routing type.

A fifth feature, combinable with any of the previous or following features, where the traffic policy is identified based on the data packet and based on a PLMN service provider or a user equipment (UE) associated with the data packet.

A sixth feature, combinable with any of the previous or following features, where the traffic policy includes at least one of a rate limiting policy or a metering policy.

A seventh feature, combinable with any of the previous features, where the operations further include: receiving a message from a MME operated by a particular corresponding PLMN service provider, wherein the message identifies a virtual EPC gateway corresponding to the PLMN service provider; and in response to receiving the message, attaching the identified virtual EPC gateway with a user equipment (UE).

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a Cathode Ray Tube (CRT), Liquid Crystal Display (LCD), Light Emitting Diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for processing a data packet in a communication network, comprising:
   receiving, at a private Mobile Edge Computing (MEC) data center, the data packet, wherein the private MEC data center hosts one or more virtual Evolved Packet Core (EPC) gateways, and each of the one or more virtual EPC gateways corresponds to a respective Public Land Mobile Network (PLMN) service provider of one or more PLMN service providers corresponding to the one or more virtual EPC gateways;
   identifying, by the private MEC data center, a traffic routing type for the data packet; and
   transmitting, from the private MEC data center, the data packet based on the identified traffic routing type.

2. The computer-implemented method of claim 1, wherein the private MEC data center is communicatively coupled with a base station that is operated by a PLMN service provider, the data packet is received from the base station and transmitted to a virtual EPC gateway corresponding to the PLMN service provider.

3. The computer-implemented method of claim 1, wherein the private MEC data center is communicatively coupled with a Mobility Management Entity (MME) that is operated by a PLMN service provider, the data packet is generated by a virtual EPC gateway corresponding to the PLMN service provider and transmitted to the MME.

4. The computer-implemented method of claim 1, wherein the traffic routing type is one of pass-through traffic, local user plane traffic, S11 control plane traffic, local service virtualized network function (VNF) traffic, Selected IP Traffic Offload (SIPTO) traffic, or inter-operator traffic.

5. The computer-implemented method of claim 1, further comprising:
   identifying, based on the data packet, a traffic policy; and
   transmitting the data packet according to the traffic policy and based on the identified traffic routing type.

6. The computer-implemented method of claim 5, wherein the traffic policy is identified based on the data packet and based on a PLMN service provider or a user equipment (UE) associated with the data packet.

7. The computer-implemented method of claim 5, wherein the traffic policy comprises at least one of a rate limiting policy or a metering policy.

8. The computer-implemented method of claim 1, further comprising:
receiving a message from a MME operated by a particular corresponding PLMN service provider, wherein the message identifies a virtual EPC gateway corresponding to the PLMN service provider; and
in response to receiving the message, attaching the identified virtual EPC gateway with a user equipment (UE).

9. A private Mobile Edge Computing (MEC) data center, comprising:
a non-transitory memory storage comprising instructions; and
one or more hardware processors in communication with the memory storage, wherein the one or more hardware processors execute the instructions to:
receive, at a private Mobile Edge Computing (MEC) data center, a data packet, wherein the private MEC data center hosts one or more virtual Evolved Packet Core (EPC) gateways, and each of the one or more virtual EPC gateways corresponds to a respective Public Land Mobile Network (PLMN) service provider of one or more PLMN service providers corresponding to the one or more virtual EPC gateways;
identify, by the private MEC data center, a traffic routing type for the data packet; and
transmit, from the private MEC data center, the data packet based on the identified traffic routing type.

10. The private MEC data center of claim 9, wherein the private MEC data center is communicatively coupled with a base station that is operated by a PLMN service provider, the data packet is received from the base station and transmitted to a virtual EPC gateway corresponding to the PLMN service provider.

11. The private MEC data center of claim 9, wherein the private MEC data center is communicatively coupled with a Mobility Management Entity (MME) that is operated by a PLMN service provider, the data packet is generated by a virtual EPC gateway corresponding to the PLMN service provider and transmitted to the MME.

12. The private MEC data center of claim 9, wherein the traffic routing type is one of pass-through traffic, local user plane traffic, S11 control plane traffic, local service virtualized network function (VNF) traffic, Selected IP Traffic Offload (SIPTO) traffic, or inter-operator traffic.

13. The private MEC data center of claim 9, wherein the one or more hardware processors execute the instructions to:
identify, based on the data packet, a traffic policy; and
transmitting the data packet according to the traffic policy and based on the identified traffic routing type.

14. The private MEC data center of claim 13, wherein the traffic policy is identified based on the data packet and based on a PLMN service provider or a user equipment (UE) associated with the data packet.

15. The private MEC data center of claim 13, wherein the traffic policy comprises at least one of a rate limiting policy or a metering policy.

16. The private MEC data center of claim 9, wherein the one or more hardware processors execute the instructions to:
receiving a message from a MME operated by a particular corresponding PLMN service provider, wherein the message identifies a virtual EPC gateway corresponding to the PLMN service provider; and
in response to receiving the message, attaching the identified virtual EPC gateway with a user equipment (UE).

17. A non-transitory computer-readable medium storing computer instructions for processing a data packet in a communication network, that when executed by one or more hardware processors, cause the one or more hardware processors of a router to perform operations comprising:
receiving, at a private Mobile Edge Computing (MEC) data center, the data packet, wherein the private MEC data center hosts one or more virtual Evolved Packet Core (EPC) gateways, and each of the one or more virtual EPC gateways corresponds to a respective Public Land Mobile Network (PLMN) service provider of one or more PLMN service providers corresponding to the one or more virtual EPC gateways;
identifying, by the private MEC data center, a traffic routing type for the data packet; and
transmitting, from the private MEC data center, the data packet based on the identified traffic routing type.

18. The non-transitory computer-readable medium of claim 17, wherein the traffic routing type is one of pass-through traffic, local user plane traffic, S11 control plane traffic, local service virtualized network function (VNF) traffic, Selected IP Traffic Offload (SIPTO) traffic, or inter-operator traffic.

19. The non-transitory computer-readable medium of claim 17, the operations further comprising:
identifying, based on the data packet, a traffic policy; and
transmitting the data packet according to the traffic policy and based on the identified traffic routing type.

20. The non-transitory computer-readable medium of claim 19, wherein the traffic policy is identified based on the data packet and based on a PLMN service provider or a user equipment (UE) associated with the data packet.

* * * * *